US012063286B2

(12) United States Patent
Fliam et al.

(10) Patent No.: US 12,063,286 B2
(45) Date of Patent: **\*Aug. 13, 2024**

(54) LOCAL CACHE BANDWIDTH MATCHING

(71) Applicant: Comcast Cable Communications, LLC, Philadelphia, PA (US)

(72) Inventors: Richard Fliam, Greenwood Village, CO (US); David Arbuckle, Denver, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/931,382

(22) Filed: Sep. 12, 2022

(65) Prior Publication Data
US 2023/0109997 A1    Apr. 13, 2023

Related U.S. Application Data

(63) Continuation of application No. 15/585,590, filed on May 3, 2017, now Pat. No. 11,477,305.

(51) Int. Cl.
*H04L 67/63* (2022.01)
*H04L 41/0896* (2022.01)
*H04L 65/612* (2022.01)
*H04L 65/80* (2022.01)
*H04L 67/02* (2022.01)
*H04L 67/55* (2022.01)
*H04L 67/568* (2022.01)

(52) U.S. Cl.
CPC .......... *H04L 67/63* (2022.05); *H04L 41/0896* (2013.01); *H04L 65/612* (2022.05); *H04L 65/80* (2013.01); *H04L 67/02* (2013.01); *H04L 67/55* (2022.05); *H04L 67/568* (2022.05)

(58) Field of Classification Search
CPC ..... H04L 67/63; H04L 41/0896; H04L 67/02; H04L 67/55; H04L 67/568
See application file for complete search history.

(56) References Cited

U.S. PATENT DOCUMENTS

| | | |
|---|---|---|
| 2012/0163221 A1 | 6/2012 | Miyazawa |
| 2014/0317306 A1 | 10/2014 | Giladi |
| 2015/0271233 A1 | 9/2015 | Bouazizi |
| 2016/0198012 A1 | 7/2016 | Fablet et al. |
| 2017/0230442 A1* | 8/2017 | Denoual .............. H04L 67/02 |
| 2017/0272530 A1* | 9/2017 | Lo .................. H04N 21/41407 |
| 2018/0152490 A1* | 5/2018 | Hiruma ............. H04N 21/8456 |
| 2018/0227379 A1 | 8/2018 | Fablet et al. |
| 2020/0236043 A1* | 7/2020 | Sze .................... H04L 43/0852 |

FOREIGN PATENT DOCUMENTS

| | | |
|---|---|---|
| WO | 2011/139305 A1 | 11/2011 |
| WO | 2015/004276 A2 | 1/2015 |

\* cited by examiner

*Primary Examiner* — Anh Nguyen
(74) *Attorney, Agent, or Firm* — BakerHostetler (57) ABSTRACT

Methods and systems are disclosed herein for managing delivery of content fragments to a device in response to a bandwidth determination. In one implementation of the disclosure, when a content player or device requests a content fragments, a local cache may determine a bandwidth or data rate related to transmission of a content fragment from a source to the cache, and send the fragment to the player at a rate corresponding to the determined bandwidth or data rate.

22 Claims, 7 Drawing Sheets

LOCAL CACHE BANDWIDTH MATCHING

CROSS-REFERENCE TO RELATED APPLICATION

This application is a continuation application of U.S. patent application Ser. No. 15/585,590, filed May 3, 2017, now U.S. Pat. No. 11,477,305, issued Oct. 18, 2022, which is hereby incorporated by reference in its entirety for any and all purposes.

BACKGROUND

Service providers may use a number of delivery mechanisms to deliver content assets, such as video or audio assets, to their customers. For example, a user device associated with a given customer may be configured to request particular segments of a content asset, also known as content asset fragments, periodically from the service provider. In response to each request, the service provider may be configured to deliver the corresponding content asset fragment to the user device. For example, a content asset may comprise a plurality of content asset fragments each having a playback duration of two seconds, and the service provider may be configured to deliver each of the content asset fragments in response to corresponding requests from the user device. However, when the user device and the service provider communicate using HTTP/2 protocol, the service provider may be configured to detect a request for a content asset fragment, anticipate that further requests for additional content asset fragments may be made, and to deliver those content asset fragments automatically to a cache associated with the user device without a specific request from the user device for those fragments.

SUMMARY

Methods and systems are disclosed herein for slowing the delivery of a content asset fragment from a device cache to a playback component of the device in response to a bandwidth determination. In HTTP/2 protocol based communications between a service provider and a user device, a cache associated with the user device may receive a plurality of content asset fragments from the service provider even though the cache has not made a specific request for those content asset fragments. These content asset fragments may be received in response to a determination by the service provider that the user device is likely to request those content asset fragments at some point in the future. When a playback component of the user device makes a request for a given one of the content asset fragments already stored in the cache, the content asset fragment may be delivered to the playback component almost instantaneously. As a result, the playback component may believe that the available bandwidth is greater than is actually available, resulting in problems during continued playback, such as freezing and buffering. To address this problem, an estimate of actual bandwidth may be determined by the user device based on the size of a received content asset fragment and the time it took to receive the content asset fragment from the service provider. This bandwidth determination may then be used to control the speed by which the cache provides requested content asset fragments to the playback component to avoid the playback component from assuming there is more bandwidth than actually is available.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EMBODIMENTS

Methods and systems are disclosed herein for determining a bandwidth associated with playback of a content asset based on the amount of time it took for content asset to be received across a network. For example, a cache associated with a user device may receive, from a playback component of the user device, a request for a first content asset fragment, and may forward this request to a service provider. The service provider may send to a cache associated with the user device a plurality of content asset fragments in response to a determination at the service provider that the first content asset fragment is related to the plurality of other content asset fragments. The cache may be configured to determine a length of time associated with receipt of the content asset fragment from the service provider, and to further determine a bandwidth associated with the content asset fragment based on the determined length of time and a size of the content asset fragment. The cache may further be configured to send, to the playback component and for playback by the playback component, the content asset fragment based on the determined bandwidth.

Figure 1:
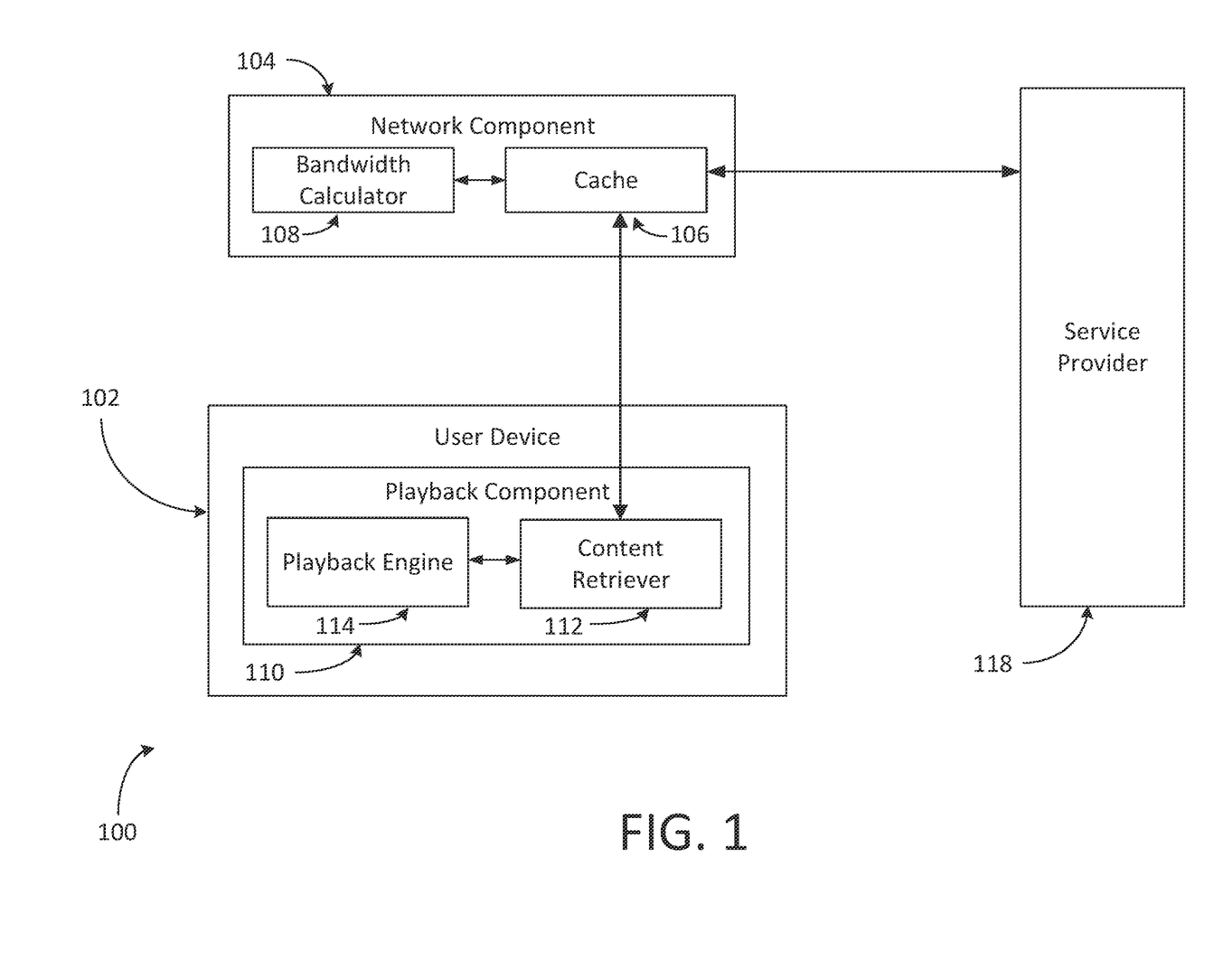
FIG. 1 shows an example block diagram of a system 100 in accordance with aspects of the disclosure.

FIG. 1 illustrates an exemplary system 100 by which a network component, such as network component 104, may be configured to communicate with a service provider 118 (e.g., Internet service provider, cable television service provider, etc.) and to receive requests from a user device 102 for a content asset made available by the service provider 118. A content asset may comprise, for example, a video asset available from the service provider 118 using the IP protocol, such as a television show, a movie, or sports broadcast, an audio asset, or any other type of media made available by a service provider. The service provider 118 may be configured to convert the content asset, for example, from one video format to another video format, such as one amenable to the means by which the service provider's users view the content. The content asset may be in any one of a variety of formats, such as, for example, H.264, MPEG-4 Part 2, or MPEG-2. The content asset may be transmitted using one or more standards such as SCTE 35 or other specifications.

Digital audio/video compression may be utilized for the content asset, such as MPEG, or any other type of compression. Although reference may be made to example standards (e.g., MPEG) and formats, the systems and methods described herein are applicable to any format or standard that support audio and/or video. As an example, the Moving Pictures Experts Group (MPEG) was established by the international Standards Organization (ISO) for the purpose of creating standards for digital audio/video compression. The combined MPEG-1, MPEG-2, and MPEG-4 standards are hereinafter referred to as MPEG. In an MPEG encoded transmission, content and other data are transmitted in packets, which collectively make up a transport stream. The present methods and systems may employ transmission of MPEG packets. However, the present methods and systems are not so limited, and may be implemented using other types of transmission and data.

The output of a single MPEG audio and/or video coder may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some example, each channel may include one video stream, one or two audio streams, and any necessary metadata. A receiver wishing to tune to a particular "channel" merely has to decode the payload of the PIDs associated with its program. The receiver may discard the contents of all other PIDs.

The service provider 118 may be configured to segment the content asset into a plurality of content asset fragments, or, in the event that the program has been previously segmented, to re-segment the content asset. For example, a content asset may be segmented into a series of two-second fragments, ten-second fragments, or other fixed or variable time fragments of any duration. For example, a thirty-minute television show may be divided into 900 fragments such that each content asset fragment represents approximately two-seconds of content. The terms "fragment" and "segment" may refer to any portion of a content asset and may be used interchangeably herein.

The service provider 118 may be further configured to create a manifest file associated with the content asset. Generally, a manifest file may contain information describing various aspects of the associated content asset that may be useful for the user device 102 to playback the content asset and/or for the service provider 118 to store and retrieve the program. For example, a manifest file may indicate each of the plurality of content asset fragments, the length of each fragment, the number of fragments, and/or the proper ordering of the fragments necessary to effectuate a playback of the content asset. A manifest file may further include a network location (e.g., a hyper-text transfer protocol (HTTP) uniform resource locater (URL) link or other universal resource identifier (URI)) for each fragment from which the fragment may be downloaded, accessed, or retrieved. It will be appreciated that the network locations included within a manifest file may point to more than one different location or source. A manifest file may be provided to the user device 102 in response to a request to receive a program, such as a content asset. The user device 102 may use the manifest file to determine the fragments required to play the program or a portion of the program and subsequently download the required fragments using the network locations specified in the manifest file.

The user device 102 may comprise any combination of a hardware element, such as a set-top cable box, a streaming-video player, or a quadrature amplitude modulation (QAM) client, or a software element, such as a web browser or other software adapted to playback video. In one example, the user device 102 may be a laptop, a television, a smartphone, a tablet, a desktop, a VR headset, or any other device capable of presenting content to a user.

The service provider 118 may deliver the content asset to the user device 102 using a request-response framework. For example, user device 102 may request particular segments of a content asset, also known as content asset fragments, periodically from the service provider 118. In response to each request, the service provider 118 may be configured to deliver the corresponding content asset fragment to the user device 102. Each of the fragments may comprise, for example, a two second segment of a larger content asset or video asset.

The network component 104 illustrated in FIG. 1 may be configured to communicate with the service provider 118 and to receive a content asset fragment over a network, as discussed further below. The network may comprise any type of suitable network including, for example, a local area network, a wide area network, and/or a public network such as the Internet. The network component 104 may comprise a cache, such as cache 106. The cache 106 may be, for example, a stand alone cache or may be part of a gateway or a media hub located in a house of the user. The cache 106 may serve as a temporary storage device configured to store data, such as one or more content asset fragments, received from the service provider 118. As illustrated in FIG. 1, the cache 106 may be located external to the user device 102 and may communicate with the user device 102 over a network. However, in one example, the network component 104 including the cache 106 may be a part of the user device 102. The network component 104 may further comprise a bandwidth calculator component 108. The bandwidth calculator component 108 may be configured to determine an amount of time associated with receiving a content asset fragment from the service provider 118 over the network, as further discussed below.

The playback component 110 associated with the user device 102 may comprise a content retriever component 112 and a playback engine 114. The content retriever component 112 may be configured to retrieve one or more content asset fragments from the cache 106 in response to a request from the playback engine 114. For example, the cache 106 associated with the user device 102 may be configured to send to the service provider 118 a request for a content asset fragment. In response to this request, the service provider 118 may be configured to send the content asset fragment to the cache 106 associated with the user device 102. In addition, as discussed further below, the service provider 118 may be configured to determine one or more additional content asset fragments associated with or related to the requested content asset fragment, and to send or "push" those asset fragments to the cache 106 as well. Once stored in the cache 106, these content asset fragments may be retrieved by the content retriever component 112, for example, in response to request by the playback engine 114. The playback engine 114 may be configured to retrieve the content asset fragment from the content retriever component 112 and to make the content asset fragment available for playback.

A device, such as user device 102 illustrated in FIG. 1, may be configured to communicate with a server, such as service provider 118, using Hypertext Transfer Protocol (HTTP), for example, HTTP/1.1 or HTTP/2 protocols. As shown in FIG. 1, the device 102 may be configured to communicate with the service provider 118 through the network component 104. HTTP protocol is a sequence of rules that mediate the communication and transfer of data over the Internet. HTTP may function as a request-response protocol in a client-server computing model. For example, a client, such as user device 102 shown in FIG. 1, may submit an HTTP request message to a server, such as service provider 118. The server may then be configured to return a response message to the client. The response message may comprise resources such as HTML files and other content requested by the user device.

Figure 2A:
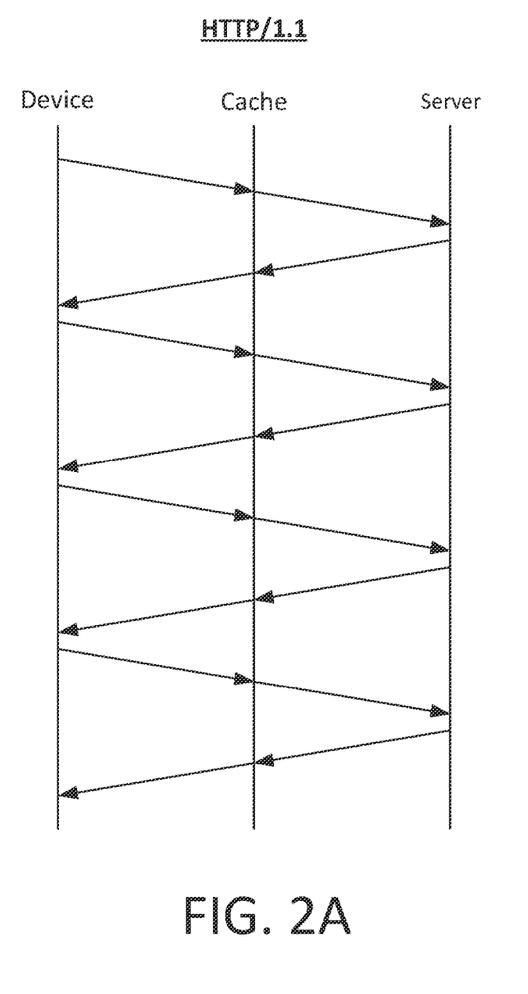
FIG. 2A illustrates an example communication between a client and a server using HTTP/1.1 protocol.

An example communication between a device and a server using HTTP/1.1 protocol is illustrated in FIG. 2A. As shown in FIG. 2A, the device, such as user device 102, may be configured to request a content asset fragment from the server, such as a content source associated with service provider 118. This request may be sent from the user device to a cache associated with the user device, such as cache 106 illustrated in FIG. 1. The cache may then be configured to forward this request to the server. The content asset may comprise, for example, a two-second portion of a television show or movie. The service provider 118, upon receiving the request, may be configured to return the requested content asset fragment to the cache 106 associated with the user device 102. The cache 106, upon receiving the content asset fragment, may send the content asset fragment, for example, to the content retriever component 112 associated with the user device 102. The user device 102 may then send to the cache 106 a second request for a second content asset fragment, and the process may continue as illustrated in FIG. 2A. A user device communicating with a server using HTTP/1.1 protocol may be limited in the sense that each content asset fragment may need to be requested and received individually before a request for a different content asset fragment may be generated.

HTTP/2 presents a revision of the HTTP network protocol and includes new capabilities over HTTP/1.1. For example, a user device communicating with a server using HTTP/2 protocol may send to the server multiple requests for data, such as a content asset, at the same time. For example, the user device 102 illustrated in FIG. 1 may communicate with the service provider 118 over the network using HTTP/2 protocol and may send to the service provider 118 multiple requests for content assets without the need to wait for a response from the service provider between each request. HTTP/2 may further allow the server to receive requests for content in any order, and to receive from the user device 102 an indication of priorities for the respective content assets it is requesting. In another example, HTTP/2 may allow headers to be sent all in a single communication, as discussed further below, and to utilize compression techniques. This is in contrast to the HTTP/1.1 protocol, which requires that a user device send each header individually for every piece of data or content requested from the server. HTTP/2 may also allow a server to send resources, such as content assets, to a user device that the user device has not yet requested, also known as a server "push." For example, the service provider 118, in response to receiving a request for a content asset fragment from user device 102, may be configured to determine one or more content asset fragments related to the requested content asset fragment and to "push" those one or more content asset fragments to the user device 102 without a specific request from the user device 102.

Figure 2B:
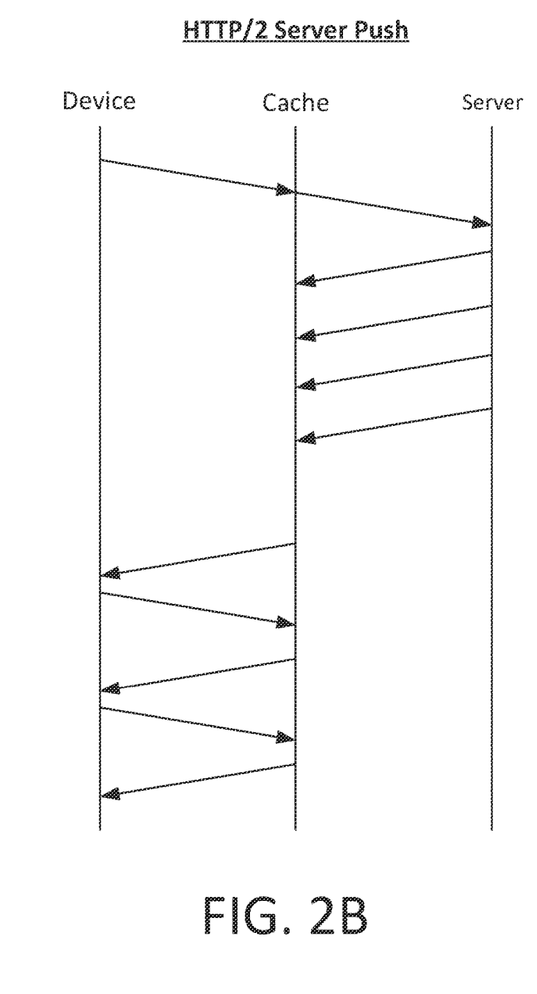
FIG. 2B illustrates an example communication between a client and a server using HTTP/2 protocol.

A number of these capabilities associated with HTTP/2 protocol may be illustrated as shown in FIG. 2B. For example, a device, such as user device 102, may be configured to send a request for a content asset fragment to a cache associated with the user device, such as cache 106. The cache 106 may send this request to a server, such as service provider 118, utilizing HTTP/2 protocol. The service provider 118 may be configured to determine the content asset fragment corresponding to the request and to send that content asset fragment to the cache 106. The service provider 118 may be further configured to determine one or more content asset fragments related to or associated with the originally requested content asset fragment. For example, if the request by the user device was for a content asset fragment of a first portion of a video, such as a television show or a movie, the server may be configured to determine that the user device will likely request the remaining fragments of the video. As discussed above, if the user device 102 requests a fragment corresponding to a first two-second segment of a 30 minute video, the service provider 118 may be configured to determine that the user device will likely request the remaining portions of the content asset and to send those remaining portions to the cache 106 without a request from the user device 102. This process may be referred to herein as a "push promise," where the service provider elects to push the content asset fragment to the user device before the user device has actually requested the content asset fragment. When the user device 102 does eventually request the content, for example, through the content retriever component 112 associated with the device 102, the request may be served by the cache 106 almost instantaneously.

As discussed herein, a server, such as the service provider 118 illustrated in FIG. 1, may predict which content asset fragments that a user device is likely request and to push those content asset fragments to the user device using one or more messages, such as push promise messages. When the user device, for example, through the content retriever component 112 associated with user device 102, later requests playback of the content asset fragment, it can receive the content asset fragment directly from the cache 106 and may begin playback of the content asset fragment almost instantaneously. The content retriever component 112 may receive the content asset fragment directly from the cache 106 in the same way that the cache 106 would normally request the content asset fragment from the service provider 118, without any knowledge on the part of the content retriever component 112 that the content asset fragment is already stored in the cache 106. This may result in reducing latency. Latency refers to the amount of time it takes for a packet of data to get from one designated point to another, for example, from the service provider 118 to the cache 106. With the new features of HTTP/2 protocol, such as push promise, a portion of this latency may be eliminated as the content may be delivered to the cache 106 from the service provider 118 without a specific request, and the content retriever component 112, upon issuing a request to the cache 106, may receive the content asset fragment from the cache 106 almost instantaneously.

However, communications based on HTTP/2 protocol may present a problem for the user device in determining an appropriate playback quality for the content. For example, a user device using adaptive bitrate (ABR) streaming may ordinarily determine an appropriate bandwidth for content playback based on the total amount of time it took to download the content asset fragment from the service provider. ABR streaming is a method of content streaming where the content is encoded at multiple bit rates, and each of the different bit rate streams are segmented into small multi-second parts. When playback begins, the user device may request segments from the lowest bit rate stream in order to prevent freezing of the content. If the user device later finds that the download speed is greater than the bit rate of the segment downloaded, then it may request the next higher bit rate segments. Alternatively, if the user device later finds the download speed for a segment is lower than the bit rate for the segment, and therefore determines that network throughput has deteriorated, it may request a lower bit rate segment.

As discussed herein, when the user device 102 requests a content asset fragment from the service provider 118 using HTTP/2 protocol, the service provider 118 may send back to the cache 106 associated with the user device 102 a plurality of content asset fragments in a server push. When the content retriever component 112 later requests a second content asset fragment from the cache 106, the second content asset fragment may be served by the cache 106 to the content retriever component 112 almost instantaneously, without sending a request for the second content asset fragment to the service provider 118. While this process improves latency, it may also result in the user device 102 determining that it has more bandwidth than is actually available. This may result in a saw-tooth pattern where the user device 102 requests a high playback quality for the content asset fragment based on the perceived bandwidth, followed by a freezing or buffering of the content asset because the actual network conditions do not match this perceived bandwidth. Because of the push nature of HTTP/2, traditional calculations do not reflect the network conditions in a way that is useful for determining which bandwidth to use. In order to address these issues, the cache 106 may be configured to delay the delivery of the content asset fragments to the playback component 110 based on a bandwidth determination that more accurately reflects the bandwidth available to the user device 102. This process may be further illustrated as shown in connection with FIG. 3.

Figure 3:
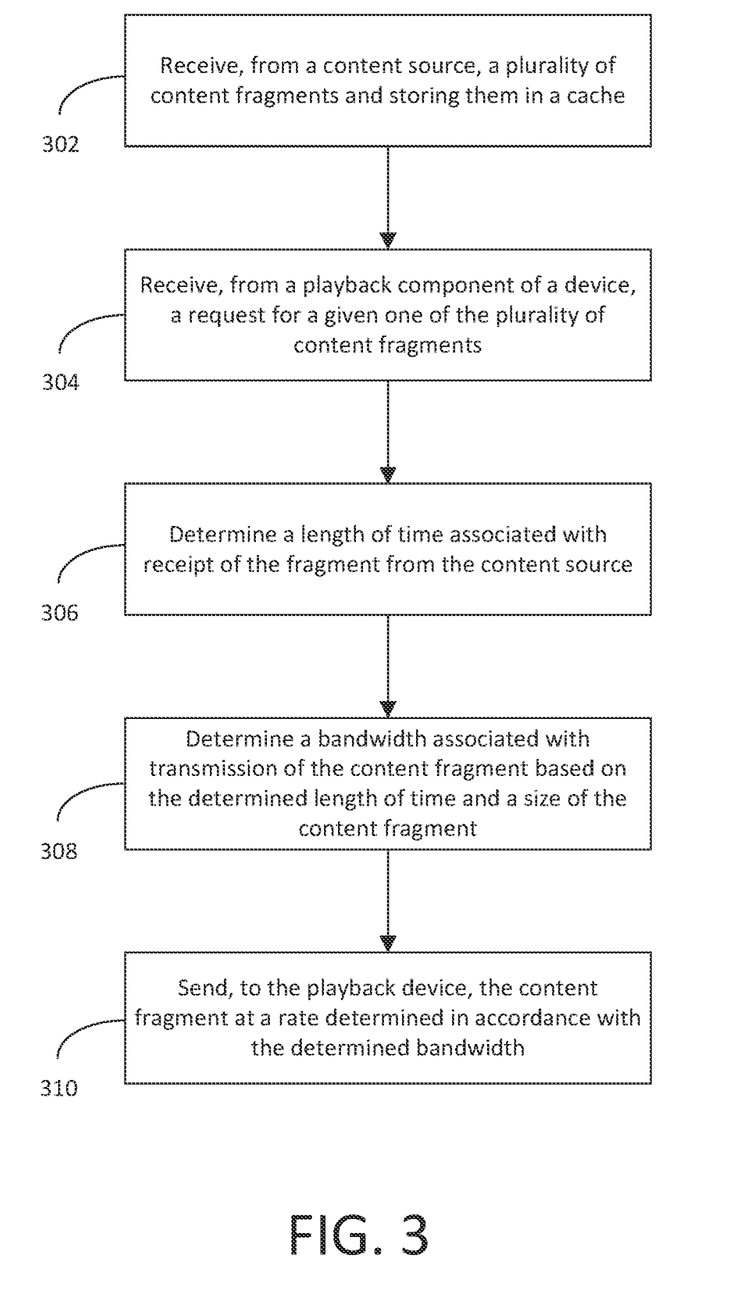
FIG. 3 shows a flow chart of an exemplary method in accordance with aspects of the disclosure.

As shown at step 302 of FIG. 3, a cache, such as cache 106, may receive a plurality of content asset fragments. The cache 106 may receive the plurality of content asset fragments from a source, such as a service provider, a content delivery network, etc. In one example, the cache 106 associated with the user device 102 may receive a request for a content asset fragment from the content retriever 112 and may send, to the service provider 118, the request for a content asset fragment. In response to this request, the service provider 118 may determine a plurality of content asset fragments related to the requested content asset fragment and may send the plurality of content asset fragments to the cache 106, for example, through a message such as a push promise message. The service provider 118 and the cache 106 may communicate, for example, using HTTP/2 protocol.

As shown at step 304 of FIG. 3, a request for a given one of the plurality of content asset fragments may be received. For example, the cache 106 associated with the user device 102 may receive, from the playback component 110 of the device 102, a request for a given one of the plurality of content asset fragments stored in the cache 106. Specifically, the request for a given one of the plurality of content asset fragments may be generated by the content retriever component 112 associated with the playback component 110. The given one of the content asset fragments may comprise, for example, a two-second segment of a thirty-minute television show.

As shown at step 306, a length of time associated with receipt of the content asset fragment may be determined. The cache 106, or an associated computing device, may be configured to determine a length of time associated with receipt of the content asset fragment from a source, such as a content data network (CDN) associated with the service provider 118, or another content source. For example, the content asset fragment may comprise a timestamp indicating a point in time that the content asset fragment was sent from the source. The cache 106, upon receiving the content asset fragment, may be configured to compare the timestamp with a current time using, for example, a clock associated with the cache 106. The cache 106 may be configured to compute the difference in time between the time indicated in the timestamp and the current time determined from the clock. As discussed herein, the cache 106 may communicate with the service provider 118 using a communication protocol such as the HTTP/2 protocol. In one implementation, the cache 106 may receive one or more content asset fragments without having sent a specific request for the content asset fragments. The service provider 118 may be configured to send to the cache 106 the plurality of content asset fragments in a message, such as a push promise message, based on a determination that the cache 106 is likely to request the content asset fragments at a later time.

The message, such as a push promise message, may comprise the size of each of the one or more content asset fragments. For example, the push promise message may comprise an indication that a given one of the content asset fragments begins at a first predetermined bite and ends at a second predetermined bite. The cache 106 or an associated computing device may also determine the size of the fragments using another technique or information source. The cache 106 may use the information to measure how long it took to receive the amount of bytes and to determine the length of time associated with receipt of the content asset from the service provider 118 by measuring the time between the first received byte and the last received byte. In one example, the cache 106 or an associated device may comprise an internal clock used to determine the time between the first received bite and the second received bite.

As shown at step 308, a bandwidth associated with transmission of the content asset may be determined based on the determined length of time and a size of the content asset fragment. The determined length of time may be the length of time between the first received byte of the content asset fragment and the last received byte of the content asset fragment. For example, a bandwidth calculator component 108 associated with the cache 106 may be configured to determine the bandwidth associated with transmission of the content asset fragment based on the determined length of time and a size of the content asset fragment. For example, the bandwidth calculator component may determine the bandwidth by dividing the size of the content asset fragment by the determined length of time, as represented by the following equation:

Data Size÷(Start time−End time)

The start time may be, for example, the time at which a first byte of the content asset fragment is received at the cache 106, and the end time may be, for example, the time at which a last byte of the content asset fragment is received at the cache 106.

Figure 4:
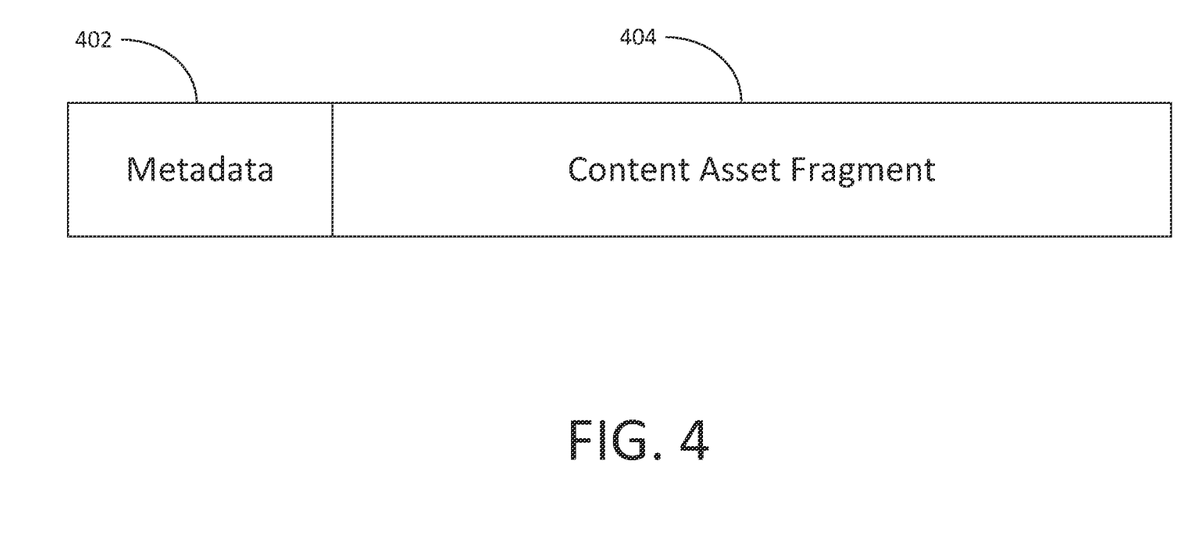
FIG. 4 shows an example of metadata stored with a content asset fragment received from a service provider.

As shown at FIG. 4, the user device may store the size of the content asset fragment as metadata with the corresponding content asset fragment. The user device may also be configured to store the determined bandwidth as metadata with the corresponding content asset fragment. The cache 106 associated with the user device 102 may send this metadata along with the content asset fragment to the playback component 110, for example, to a content retriever component 112 associated with the playback component 110. Using this received metadata, the user device 102 or the cache 106 may determine a playback quality of the content asset fragment based on the determined bandwidth.

As shown at step 310, the content asset fragment may be sent to a user or playback device at a rate determined in accordance with the determined bandwidth. For example, the cache 106 may send, to a playback component 110 associated with the device 102, the content asset fragment at a rate determined in accordance with the determined bandwidth. In one example, the content asset fragment may be sent at a rate that does not exceed the determined bandwidth. As discussed herein, the cache 106 may be configured to slow the delivery of the content asset fragment in order to mimic the actual network bandwidth, as opposed to the bandwidth perceived by the playback component 110 in receiving the requested content asset almost instantaneously from the cache 106. This may reduce problems such as freezing and buffering as a result of the playback component 110 detecting more bandwidth than it actually has. The cache 106 may be configured to determine a playback quality associated with the content asset fragment based on the determined bandwidth. The cache 106 may send an indication of the playback quality to the playback component 110.

The cache 106 may further receive from the service provider 118 a manifest identifying the plurality of content asset fragments available for playback by the playback component 110. For example, in response to receiving a request for a content asset fragment from the cache 106, the service provider 118 may be configured to determine a plurality of related content asset fragments, such as other fragments of the same content asset, and to send a manifest to the cache 106 identifying the plurality of content asset fragments available for playback by the playback component 110. This manifest may be made available to the playback component 110, and the playback component 110 may use this manifest in requesting content asset fragments from the service provider 118 in the future. As discussed herein, the playback component 110 may continue to request the content asset fragments from the service provider 118 through the cache 106 as the playback component 110 may not be aware that the cache 106 has already received the plurality of content asset fragments from the service provider 118.

As discussed herein, the cache 106 may be modified to calculate the time it actually took for data, such as a content asset fragment, to be received across the network. This may be accomplished by taking advantage of the message, such as the push promise message, which may contain a size of the content asset fragment, and an internal clock. Based on this information, the cache 106 may be configured to slow the delivery of the content asset fragment to the playback component 110 to mimic the network conditions it would have had receiving the content asset fragment from the service provider 118. For example, if it took two milliseconds to receive 100 megabytes of data from the service provider 118, the cache 106 may send to the playback component 110 one-half megabyte per millisecond. This process may remove latency in the user device's streaming capacity, particularly on mobile streaming devices, for example, cellular telephones, which could be upwards of half the total time it takes to receive the data from the service provider. In this case, the client's bandwidth may be increased significantly, for example, doubled, without modifying anything physical on the user device 102.

Figure 5:
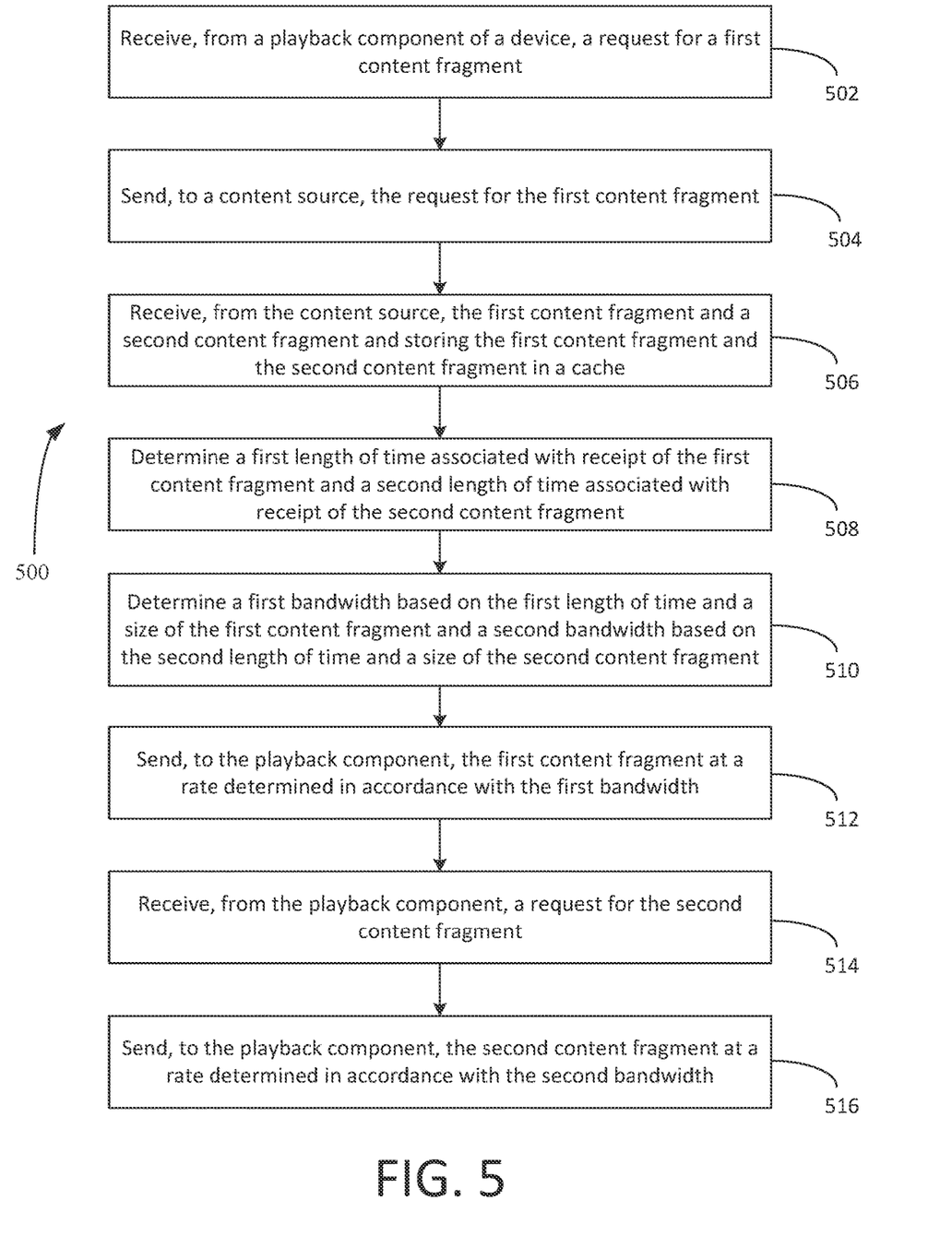
FIG. 5 shows a flow chart of an exemplary method in accordance with aspects of the disclosure.

FIG. 5 illustrates an example flow chart for a method 500 for receiving, in response to sending a request for a first content asset fragment to a server, the first content asset fragment and a second content asset fragment, and sending to a playback component the first content asset fragment and the second content asset fragment at a rate in accordance with a determined bandwidth. As shown in at step 502 of FIG. 5, a request for a first content asset fragment may be received. For example, a cache 106 may receive a request from the playback component 110 for the first content asset fragment. The first content asset may comprise, for example, a two-second fragment of a thirty-minute television show.

As shown at step 504, the request for the first content asset may be sent to a service provider. For example, the cache 106 associated with the user device 102 may send to the service provider 118 the request for the first content asset fragment. The user device 102, the cache 106 and the service provider 118 may communicate using HTTP/2 protocol.

As shown at step 506, the first content asset and a second content asset fragment may be received. For example, in response to sending to the service provider 118 the request for the first content asset fragment, the cache 106 associated with the user device 102 may receive from the service provider 118 the first content asset fragment and a second content asset fragment. Receiving the first content asset fragment and the second content asset fragment may comprise receiving the first content asset fragment and the second content asset fragment in response to a determination by the service provider 118 that the playback component 110 is likely to request playback of the second content asset fragment. Determining at the service provider that the playback component is likely to request the second content asset fragment may comprise determining that the second content asset fragment is related to the first content asset fragment. For example, as discussed above, the first content asset fragment may comprise a first fragment, for example, a two-second fragment, of a thirty-minute television show. The service provider may be configured to determine, in response to receiving a request for the first content asset fragment, that the user device 102 is likely to request a second content asset fragment that corresponds to a second segment of the same thirty-minute television show. The service provider 118 may be configured to send, in addition to the second content asset fragment, all or a portion of the remaining segments of the television or movie asset.

As shown at step 508, a first length of time associated with receipt of the first content asset fragment and a second length of time associated with receipt of the second content asset fragment may be determined. As discussed herein, the cache 106, communicating with the service provider 118 using HTTP/2 protocol, may receive the second content asset fragment from the service provider 118 without having sent a specific request to the service provider 118 for the second content asset fragment. The service provider 118 may be configured to send to the cache 106 the first content asset fragment and the second content asset fragment in a message, such as a push promise message, based on a determination that the cache 106 is likely to request the second content asset fragment at a later time.

The message may comprise the size of the first content asset fragment and the size of the second content asset fragment. For example, the message may be a push promise message which comprises an indication that the first content asset fragment begins at a first predetermined bite and ends at a second predetermined bite. At least one of the cache 106 or the user device 102 may use the information to measure how long it took to receive the amount of bytes indicated in the message and to determine the length of time associated with receipt of the first content asset from the service provider 118 by measuring the time between the first received byte and the last received byte. In one example, the cache 106 may comprise an internal clock used to determine the time between the first received bite and the second received bite.

As shown at step 510, a first bandwidth may be determined based on the first length of time and a size of the first content asset fragment and a second bandwidth may be determined based on the second length of time and a size of the second content asset fragment. The size of the first content asset fragment and the size of the second content asset fragment may also be received as part of the information in the message, for example, the push promise message. In one example, the bandwidth calculator component 108 associated with the cache 106 may be configured to determine the first bandwidth by dividing the size of the first content asset fragment by the first length of time and to calculate the second bandwidth by dividing the size of the second content asset fragment by the second length of time, as represented by the following equation:

Data Size÷(Start time−End time)

As shown at FIG. 4, the user device 102 may be configured to store the size of the first content asset fragment as metadata with the first content asset fragment and the size of the second content asset fragment as metadata with the second content asset fragment. The cache 106 associated with the user device 102 may send this metadata along with the first content asset fragment and the second content asset fragment to the playback component 110, for example, to a content retriever component 112 associated with the playback component 110.

As shown at step 512, the first content asset fragment may be sent at a rate determined in accordance with the first bandwidth. For example, the cache 106 associated with the user device 102 may send to the playback component 110 the first content asset fragment at a rate determined in accordance with the first bandwidth. In one example, the first content asset fragment may be sent at a rate that does not exceed the first bandwidth. As discussed herein, the cache 106 may be configured to slow the delivery of the first content asset fragment in order to mimic the actual network bandwidth, as opposed to the bandwidth perceived by the playback component 110 in receiving the first content asset almost instantaneously from the cache 106. This may reduce problems associated with the playback component 110 detecting more bandwidth than it actually has, such as a freezing and buffering of the first content asset during playback.

As shown at step 514, a request for the second content asset may be received. For example, the cache 106 associated with the user device 102 may receive from the playback component 110 the request for the second content asset fragment. Because the cache 106 has already received the second content asset fragment from the service provider 118, or another source, the cache does not need to forward this request to the service provider 118. Instead, the cache 106 may send the second content asset fragment directly and almost instantaneously to the playback component 110 without any knowledge on the part of the playback component 110 that the cache 106 has already received the second content asset fragment from the service provider 118.

As shown at step 516, the second content asset may be sent at a rate determined in accordance with the second bandwidth. For example, the cache 106 associated with the user device 102 may send to the playback component 110 the second content asset fragment at a rate determined in accordance with the second bandwidth. In one example, the second content asset fragment may be sent at a rate that does not exceed the second bandwidth. The second bandwidth may be different from the first bandwidth. Thus, the second content asset fragment may be sent at a rate different from the rate of the first content asset fragment. This change in bandwidth between the sending of the first content asset fragment and the second content asset fragment may reflect a change in the actual network bandwidth between the time of sending the first content asset fragment and the time of sending the second content asset fragment. As discussed herein, the cache 106 may be configured to slow the delivery of the second content asset fragment in order to mimic the actual network bandwidth, as opposed to the bandwidth perceived by the playback component 110 in receiving the second content asset almost instantaneously from the cache 106. This may reduce problems associated with the playback component 110 detecting more bandwidth than it actually has, such as a freezing and buffering of the second content asset during playback.

Figure 6:
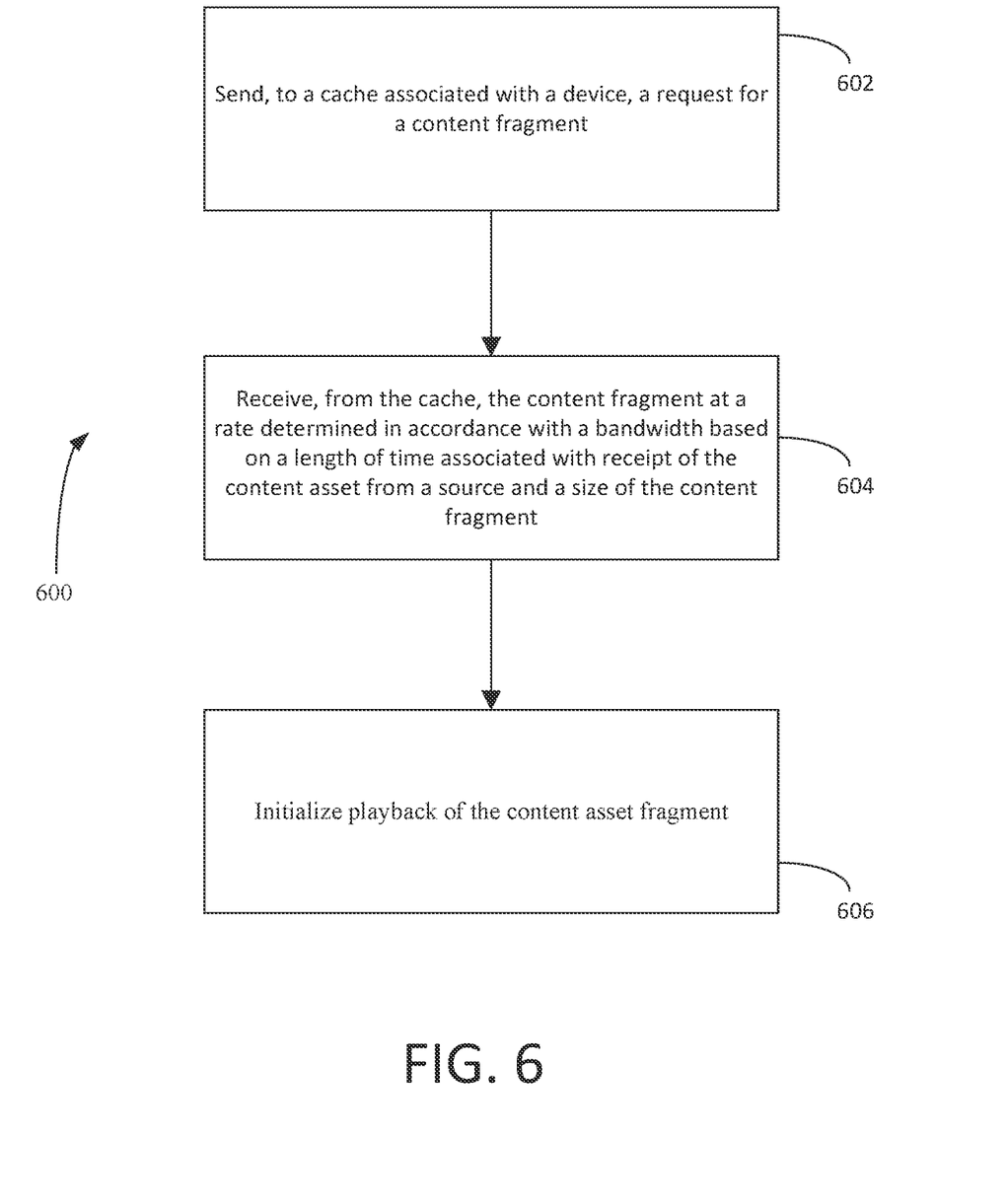
FIG. 6 shows a flow chart of an exemplary method in accordance with aspects of the disclosure.

FIG. 6 illustrates a flowchart for a method 600. As shown at step 602 of FIG. 6, a request for a content asset fragment may be sent. For example, the request for the content asset fragment may be sent to the cache 106 associated with the user device 102 by the playback component 110.

As shown at step 604, the content asset fragment may be received at a rate determined in accordance with a given bandwidth. For example, the content retriever component 110 may receive from the cache 106 the content asset fragment at a rate that does not exceed the given bandwidth. As discussed herein, the cache 106 may be configured to calculate the given bandwidth based on a length of time associated with receipt of the content asset from a service provider and a size of the content asset fragment. The cache 106 and the content provider 118 may communicate using HTTP/2 protocol. The cache 106 may be configured to receive from the service provider a message, such as a push promise message, the message comprising the size of the content asset fragment. As further discussed herein, the cache 106 may be configured to slow the delivery of the content asset fragment to the playback component in order to mimic the actual network bandwidth, as opposed to the bandwidth perceived by the playback component 110 in receiving the requested content asset almost instantaneously. The bandwidth may be determined by the cache 106, for example, by dividing the size of the content asset by the determined length of time.

As shown at step 606, the playback component may initialize playback of the content asset fragment. The playback component 110 may initialize playback of the content asset fragment at a playback quality that is based on the determined bandwidth.

Figure 7:
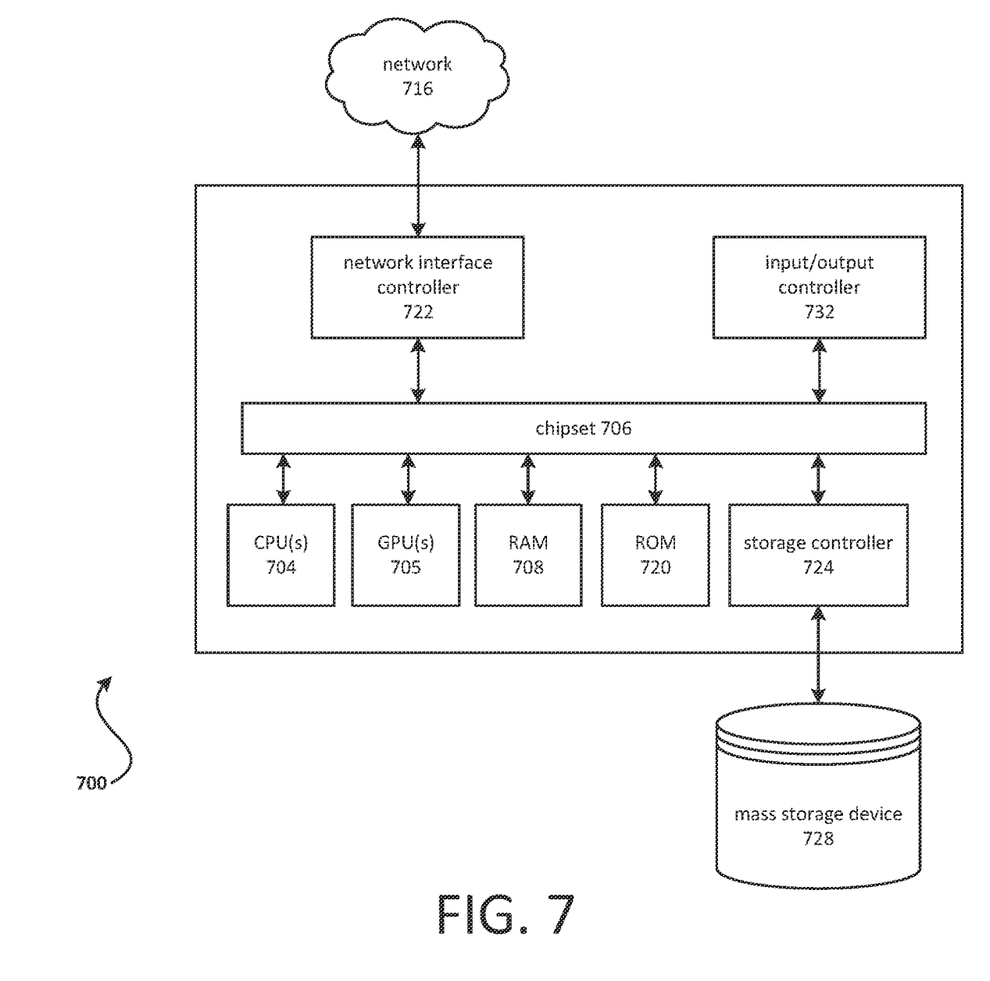
FIG. 7 illustrates a block diagram of an exemplary computing device.

FIG. 7 depicts a computing device that may be used in various aspects, such as the servers, modules, and/or devices depicted in FIG. 1. With regard to the example architecture of FIG. 1, the network library 104, the cache 106, the bandwidth calculator component 108, the playback component 110, the content retriever component 112, and/or the playback engine component 114 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3, 5 and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3, 5 and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A system comprising:
   a content source; and
   a network component comprising a computer processor and configured to:
      receive, from the content source, a plurality of content fragments and store them in a cache;
      receive, from a playback device, a request for one of the plurality of content fragments;
      determine a length of time associated with receipt of the content fragment at the network component from the content source;
      determine a bandwidth associated with transmission of the content fragment, based on the determined length of time and a size of the content fragment, from the content source; and
      send, to the playback device, the content fragment at a rate determined in accordance with the determined bandwidth.

2. The system of claim 1, wherein the network component is configured to determine a playback quality associated with the content fragment based on the determined bandwidth.

3. The system of claim 1, wherein the network component is configured to send the content fragment at a rate determined in accordance with the determined bandwidth by sending the content fragment at a rate that does not exceed the determined bandwidth.

4. The system of claim 1, wherein the network component is configured to determine a bandwidth associated with transmission of the content fragment based on dividing the size of the content fragment by the determined length of time.

5. The system of claim 1, wherein the content source communicates with the network component using HTTP/2 protocol.

6. The system of claim 5, wherein the network component is configured to receive the plurality of content fragments based on receiving a push promise message from the content source.

7. The system of claim 6, wherein the push promise message comprises the size of each of the plurality content fragments.

8. The system of claim 7, wherein the network component is configured to store the size of a content fragment as metadata with the corresponding content fragment.

9. A non-transitory computer-readable medium storing computer-executable instructions that, when executed, cause:
receiving, at a network component, from a content source, a plurality of content fragments and storing them in a cache;
receiving, from a playback device, a request for one of the plurality of content fragments;
determining a length of time associated with receipt of the content fragment at the network component from the content source;
determining a bandwidth associated with transmission of the content fragment, based on the determined length of time and a size of the content fragment, from the content source; and
sending, to the playback device, the content fragment at a rate determined in accordance with the determined bandwidth.

10. The non-transitory computer-readable medium of claim 9, wherein the instructions, when executed, further cause determining a playback quality associated with the content fragment based on the determined bandwidth.

11. The non-transitory computer-readable medium of claim 9, wherein sending the content fragment at a rate determined in accordance with the determined bandwidth comprises sending the content fragment at a rate that does not exceed the determined bandwidth.

12. The non-transitory computer-readable medium of claim 9, wherein determining a bandwidth associated with transmission of the content fragment comprises dividing the size of the content fragment by the determined length of time.

13. The non-transitory computer-readable medium of claim 9, wherein the content source communicates with the network component using HTTP/2 protocol.

14. The non-transitory computer-readable medium of claim 13, wherein receiving a plurality of content fragments comprises receiving a push promise message from the content source.

15. The non-transitory computer-readable medium of claim 14, wherein the push promise message comprises the size of each of the plurality of content fragments.

16. The non-transitory computer-readable medium of claim 15, wherein the instructions, when executed, further cause storing the size of a content fragment as metadata with the corresponding content fragment.

17. A system comprising:
a network component; and
a playback device comprising a computer processor and configured to:
send, to the network component, a request for a content fragment;
receive, from the network component, the content fragment at a rate determined in accordance with a bandwidth based on a length of time associated with receipt of the content fragment, at the network component, from a source and a size of the content fragment; and
initialize playback of the content fragment.

18. The system of claim 17, wherein the network component is configured to communicate with the source using HTTP/2 protocol.

19. The system of claim 18, wherein the network component is configured to receive from the source a push promise message, the push promise message comprising the size of the content fragment.

20. A non-transitory computer-readable medium storing computer-executable instructions that, when executed, cause:
sending, to a network component, a request for a content fragment;
receiving, from the network component, the content fragment at a rate determined in accordance with a bandwidth based on a length of time associated with receipt of the content fragment, at the network component, from a source and a size of the content fragment; and
initializing playback of the content fragment.

21. The non-transitory computer-readable medium of claim 20, wherein the network component communicates with the source using HTTP/2 protocol.

22. The non-transitory computer-readable medium of claim 21, wherein the network component receives from the source a push promise message, the push promise message comprising the size of the content fragment.

* * * * *